United States Patent
Okamoto

(10) Patent No.: US 8,285,695 B2
(45) Date of Patent: Oct. 9, 2012

(54) CATALOG PAGE GENERATION SYSTEM, DIGITAL CAMERA, COMPUTER PROGRAM PRODUCT, AND METHOD FOR CATALOG PAGE GENERATION

(75) Inventor: Teppei Okamoto, Saitama (JP)

(73) Assignee: PENTAX Ricoh Imaging Company, Ltd., Tokyo (JP)

( * ) Notice: Subject to any disclaimer, the term of this patent is extended or adjusted under 35 U.S.C. 154(b) by 630 days.

(21) Appl. No.: 12/394,137

(22) Filed: Feb. 27, 2009

(65) Prior Publication Data
US 2009/0222478 A1 Sep. 3, 2009

(30) Foreign Application Priority Data
Mar. 3, 2008 (JP) ................................ 2008-052537

(51) Int. Cl.
G06F 7/00 (2006.01)
(52) U.S. Cl. ........................ 707/705; 707/803
(58) Field of Classification Search .................. None
See application file for complete search history.

(56) References Cited

U.S. PATENT DOCUMENTS

| | | | | |
|---|---|---|---|---|
| 5,909,684 | A * | 6/1999 | Nelson | 717/118 |
| 7,437,681 | B2 | 10/2008 | Misawa et al. | |
| 7,555,479 | B2 * | 6/2009 | Piersol | 1/1 |
| 7,783,991 | B2 | 8/2010 | Misawa et al. | |
| 2001/0027454 | A1 * | 10/2001 | Tsue | 707/102 |
| 2001/0056434 | A1 * | 12/2001 | Kaplan et al. | 707/104.1 |
| 2002/0015100 | A1 * | 2/2002 | Shioji | 348/231 |
| 2003/0142953 | A1 * | 7/2003 | Terada et al. | 386/46 |
| 2003/0154190 | A1 | 8/2003 | Misawa et al. | |
| 2005/0256862 | A1 * | 11/2005 | Kim et al. | 707/4 |
| 2006/0034585 | A1 * | 2/2006 | Terada | 386/52 |
| 2006/0177211 | A1 | 8/2006 | Okamoto | |
| 2006/0263047 | A1 * | 11/2006 | Nagao et al. | 386/95 |
| 2006/0267970 | A1 * | 11/2006 | Minakuchi | 345/204 |
| 2006/0287974 | A1 * | 12/2006 | Mochizuki et al. | 707/1 |
| 2007/0171293 | A1 | 7/2007 | Okamoto | |
| 2008/0016470 | A1 | 1/2008 | Misawa et al. | |

FOREIGN PATENT DOCUMENTS

| | | |
|---|---|---|
| JP | 2003-037805 A | 2/2003 |
| JP | 2003-242004 | 8/2003 |
| JP | 2003-259257 | 9/2003 |
| JP | 2003-296165 | 10/2003 |

(Continued)

OTHER PUBLICATIONS

English language Abstract and translation of JP 2003-037805 A (Feb. 7, 2003).

(Continued)

Primary Examiner — Fred I Ehichioya
Assistant Examiner — Hasanul Mobin
(74) Attorney, Agent, or Firm — Greenblum & Bernstein, P.L.C.

(57) ABSTRACT

A catalog page generation system, comprising a first generation circuit, a first determination circuit, and a second generation circuit, is provided. The first generation circuit generates a catalog page of objects included in a first directory or a first folder. The first determination circuit determines whether or not a second directory different from the first directory or a second folder different from the first folder exists. The second generation circuit generates existence information if the first determination circuit determines that the second directory or the second folder exists. The existence information indicates the existence of another directory or another folder of the same level as the first directory or the first folder.

10 Claims, 10 Drawing Sheets

FOREIGN PATENT DOCUMENTS

| | | |
|---|---|---|
| JP | 2004-255740 | 9/2004 |
| JP | 2006-179141 | 7/2006 |
| JP | 2007-37053 | 2/2007 |
| JP | 2007-157033 | 6/2007 |
| JP | 2008-3910 | 1/2008 |

OTHER PUBLICATIONS

Japan Office action, dated Feb. 21, 2012 along with an english translation thereof.

* cited by examiner

CATALOG PAGE GENERATION SYSTEM, DIGITAL CAMERA, COMPUTER PROGRAM PRODUCT, AND METHOD FOR CATALOG PAGE GENERATION

BACKGROUND OF THE INVENTION

1. Field of the Invention

The present invention relates to a catalog page generation system, a digital camera, a catalog page generation program product, and a catalog page generation method that generates a catalog page of a plurality of objects included in a directory displayed on a monitor of a personal computer or a digital camera.

2. Description of the Related Art

Digital data storage capacities continue to increase. With the increase in the number of data files which may be stored, it becomes more and more time-consuming to search for a required data file.

For example, the number of image files storable on a storage medium for a digital camera increases with the capacity of the storage medium. In such a digital camera, a certain image file is selected among image files stored on the storage medium and an image of the selected image file is displayed on a monitor. When the number of image files stored on the storage medium is large, it becomes burdensome to search for a given image file.

As a solution to this problem, Japanese Unexamined Patent Publication No. 2003-37805 proposes a camera that generates a folder corresponding to the photographing date when an image file is generated and automatically stores the image file in the corresponding folder. The proposed camera purports to facilitate search for an image file for display by displaying a catalog page of stored image files by folder.

However, in the proposed camera, the user must bear the inconvenience of not being able to determine whether there exist other folders when a catalog page is on display.

SUMMARY OF THE INVENTION

Therefore, an object of the present invention is to provide a catalog page generation system which generates a catalog page of objects, such as files, with which the user can more easily search for an object.

According to the present invention, a catalog page generation system, comprising a first generation circuit, a first determination circuit, and a second generation circuit, is provided. The first generation circuit generates a catalog page of objects included in a first directory or a first folder. The first determination circuit determines whether or not a second directory different from the first directory or a second folder different from the first folder exists. The second generation circuit generates existence information if the first determination circuit determines that the second directory or the second folder exists. The existence information indicates the existence of another directory or another folder of the same level as the first directory or the first folder.

Further, orders are given to the first and second directories or the first and second folders.

Further, the existence information generated in case that the order given to the second directory or the second folder precedes the order of the first directory or the first folder, respectively, constitutes first existence information. The first existence information indicates that the order of another existing directory or another existing folder precedes the order of the first directory or the first folder.

Further, the existence information generated in case that the order given to the second directory or the second folder succeeds the order of the first directory or the first folder, respectively, constitutes second existence information. The second existence information indicates that the order of another existing directory or another existing folder succeeds the order of the first directory or the first folder.

Further, if the number of objects included in the first directory or the first folder is greater than the predetermined, maximum number of objects to be displayed in the catalog page, a subset of the objects are allocated into a first catalog page and another subset of are allocated into a second catalog page. The first and second catalog pages are the catalog pages generated by the first generation circuit.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
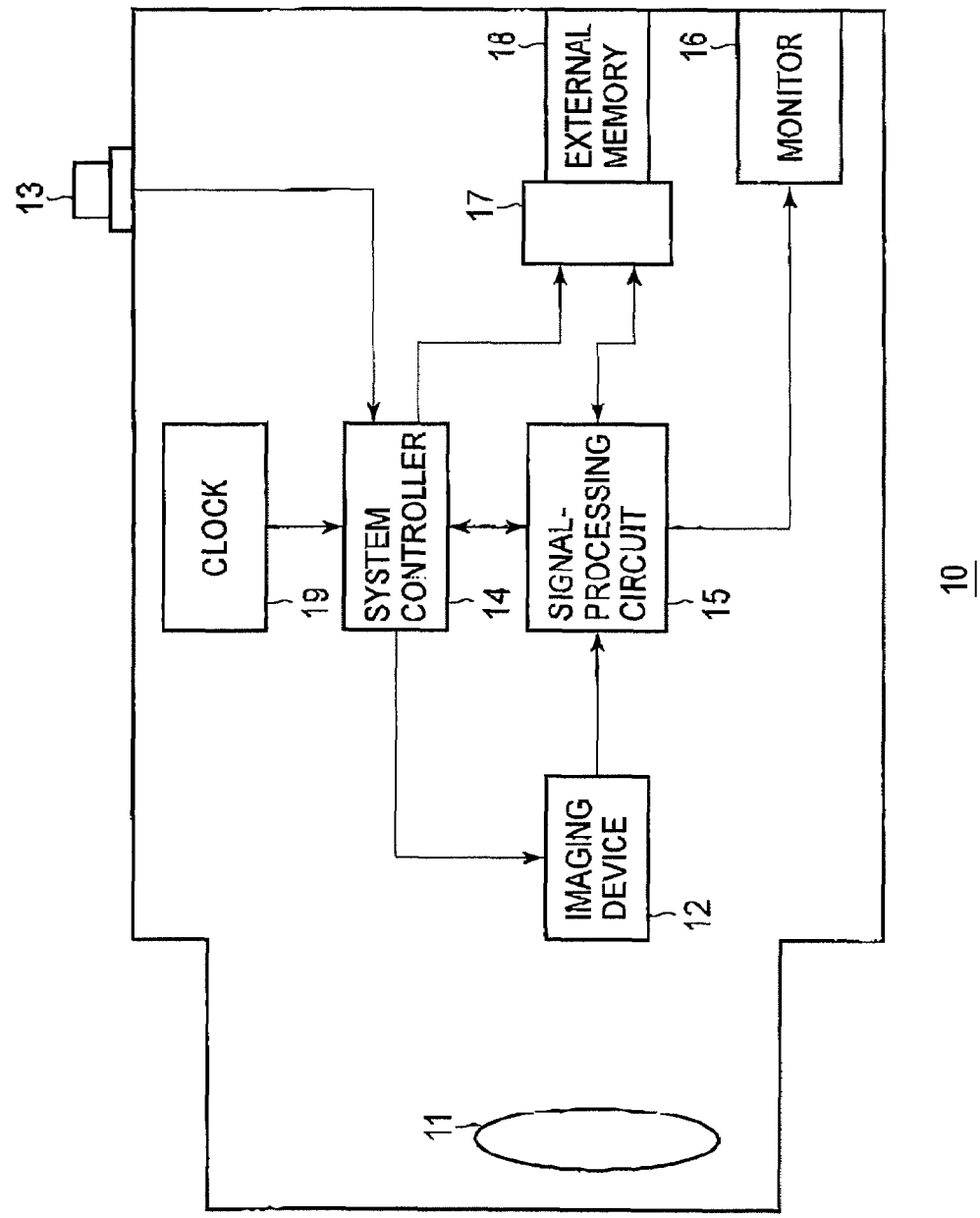
FIG. 1 is a block diagram showing the internal structure of a digital camera having a catalog page generation system, in an embodiment of the present invention.

The present invention is described below with reference to the embodiment shown in the drawings.

In FIG. 1, a digital camera 10 comprises a lens 11, an imaging device 12, a release button 13, a system controller 14 (first determination circuit, addition circuit), a signal-processing circuit 15 (first generation circuit, second generation circuit), a monitor 16, a memory connector 17, a clock 19, and other components.

The optical image of a subject entering through the lens 11 is incident on the light-receiving surface of the imaging device 12. When the user depresses the release button 13, the system controller 14 drives the imaging device 12 and the optical image incident on the light-receiving surface is captured. Then, an image signal corresponding to the captured optical image is generated by the imaging device 12.

The image signal generated by the imaging device 12 is transmitted to the signal-processing circuit 15, and the signal-processing circuit carries out predetermined signal-processing on the received image signal. In predetermined signal-processing, an image file (object) corresponding to the image signal is generated. The generated image file is transmitted to the monitor 16 or an external memory 18 connected to the memory connector 17. An image corresponding to the image file is displayed on the monitor 16. In addition, the image file transmitted to the external memory 18 is stored.

The external memory 18 contains a folder structure of a predetermined file system standard. The received image file is stored in a folder of a specified level in the existing folder structure.

Figure 2:
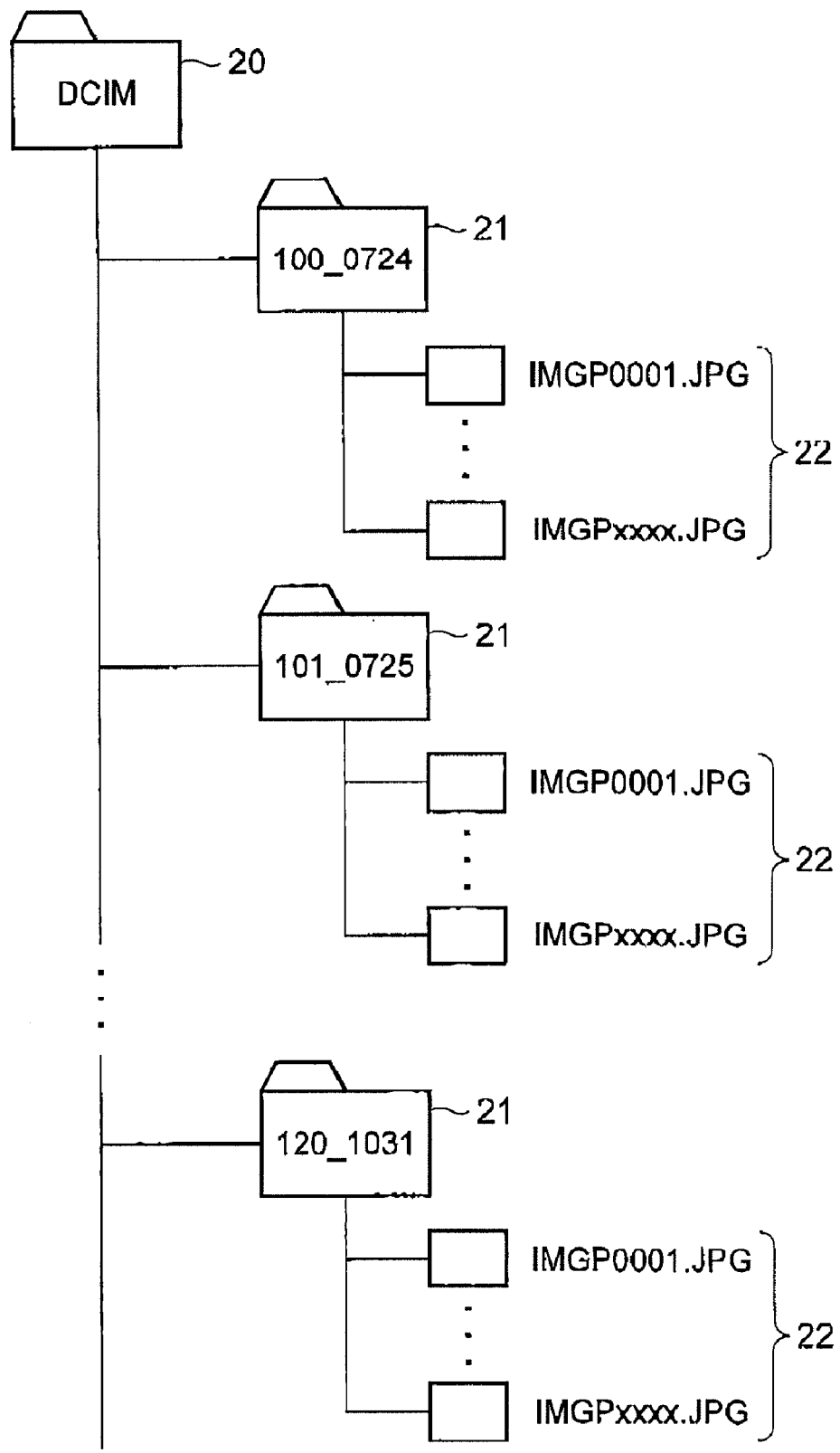
FIG. 2 illustrates a folder structure generated in the external memory.

As shown in FIG. 2, in a file system standard or this embodiment, image folders 21 (first folder, second folder) belonging to the first level are generated under a DCIM folder 20. An image file 22 generated upon capturing a still image is stored in an image folder 21.

Each image folder 21 has a folder name consisting of 8 characters. The first 3 characters represent the ordinal number of the image folder 21, and range from "000" to "999". The last 4 characters are decided, so that they indicate the month and date on which an image folder 21 is generated. For example, when the 100th image folder 21 is generated on July 24th, the name of the image folder 21 is set to "100_0724". Or, when the 101st image folder 21 is generated on July 25th, the name of the image folder 21 is set to "101_0725".

An image file 22 is stored in an image folder 21 corresponding to the month and date on which the image file 22 is generated. An image file 22 has a file name including a sequential number of 4 digits in order of generation ("0001" to "xxxx"). In addition, an image file 22 is generated according in the JPEG format, and "JPG" is added to the file name as a filename extension.

The clock 19 is connected to the signal-processing circuit 15. The clock 19 tracks the present month and date. When the release button 13 is depressed, the month and date are communicated from the clock 19 to the system controller 14. The system controller 14 determines whether or not there exists an image folder in the external memory 18 whose folder name includes the communicated month and date.

If an image folder whose name includes the month and date does not exist, the system controller 14 generates a new image folder 21. The system controller 14 determines a folder name for the newly generated image folder 21 on the basis of the communicated month and date and the order of the latest image folder 21 before generating new image folder 21. For example, if the order of the latest image folder 21 before generating a new image folder 21 is "119" and the communicated month and date is October 31st, the folder name of the newly generated image folder 21 is set to "120_1031".

On the other hand, if the image folder 22 whose name includes the month and date exists, the system controller 14 stores the generated image file 21 in the image folder 22 of the external memory 18.

In addition, when all image files 22 in a certain image folder 22 have been deleted, the image folder 22 is also deleted.

A captured imago or a catalog page of image files 22 stored in the external memory 18 can be displayed on the monitor 16. In the catalog page, image files stored in a certain image folder 22 are displayed as thumbnails.

Figure 3:
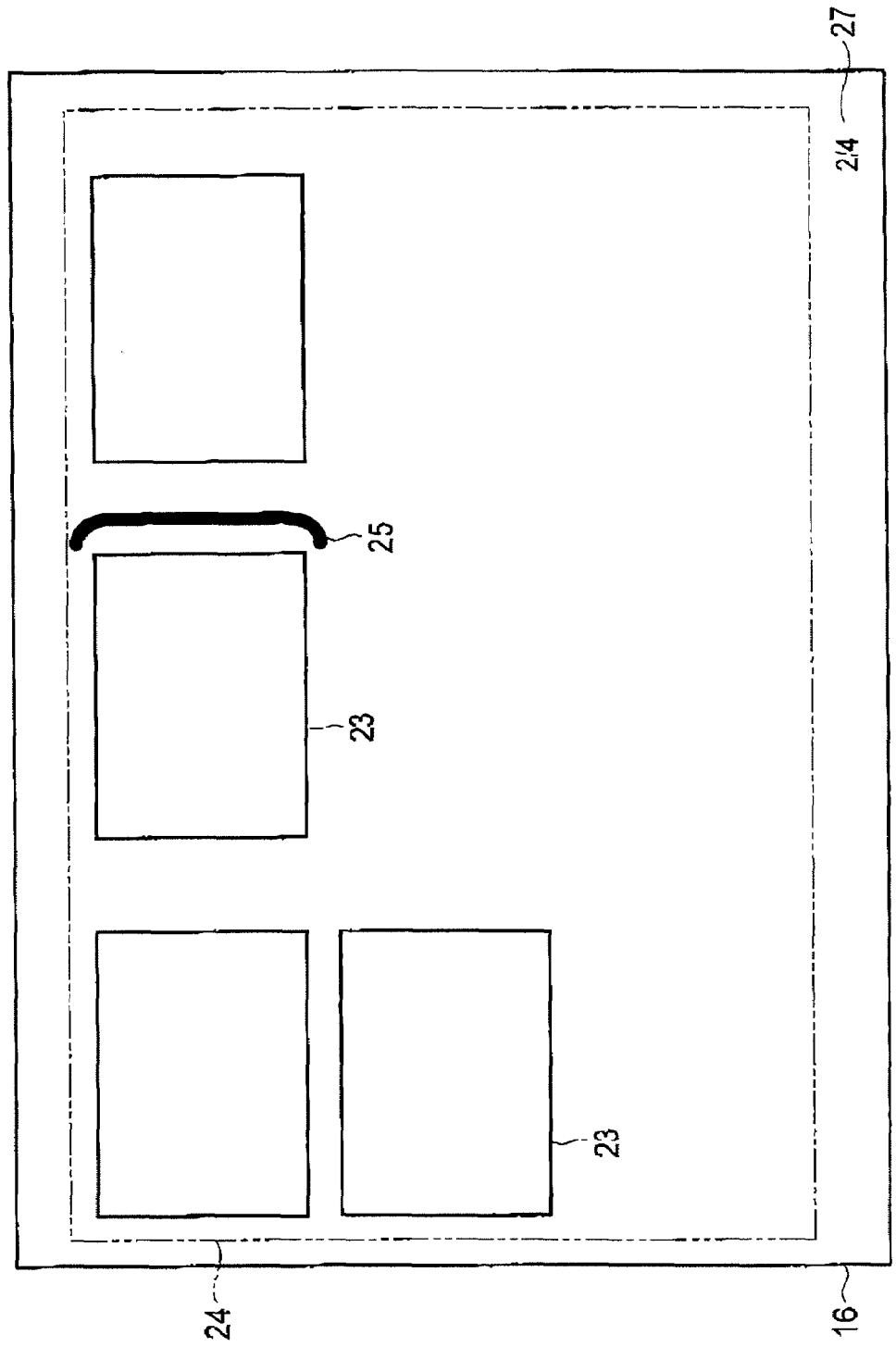
FIG. 3 illustrates the single catalog page corresponding to an image folder as displayed on the monitor.

For example, as shown in FIG. 3, when the user commands the digital camera 10 to display the catalog page on the monitor 16, thumbnails 23 of image files 22 stored in the highest ordered, image folder 21 in the external memory 18 are displayed on the monitor 16. At most, nine thumbnails 23 arranged in three rows and three columns can be simultaneously displayed on a single catalog page 24.

As shown in FIG. 3, if nine or fewer image files 22 are stored in a certain image folder 21, thumbnails of all the image files 22 are displayed on a single catalog page 24. On the other hand, if ten or more image files 22 are stored in a certain image folder 21, thumbnails of the image files 22 are allocated into and displayed on different catalog pages 24.

Figure 4:
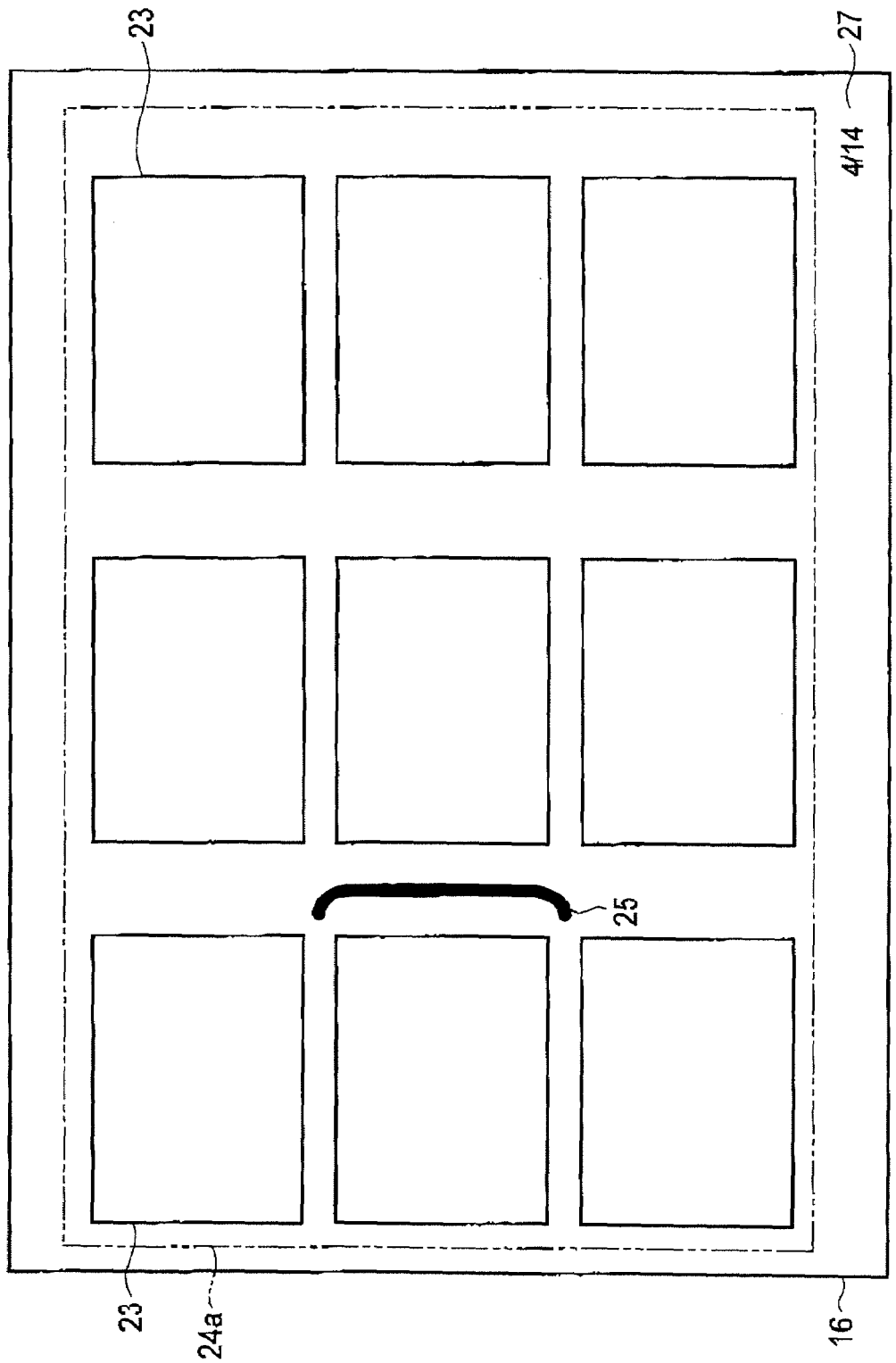
FIG. 4 illustrates the first among multiple catalog pages generated for an image folder with more images than can be thumbnailed in only one page, as displayed on the monitor.
Figure 5:
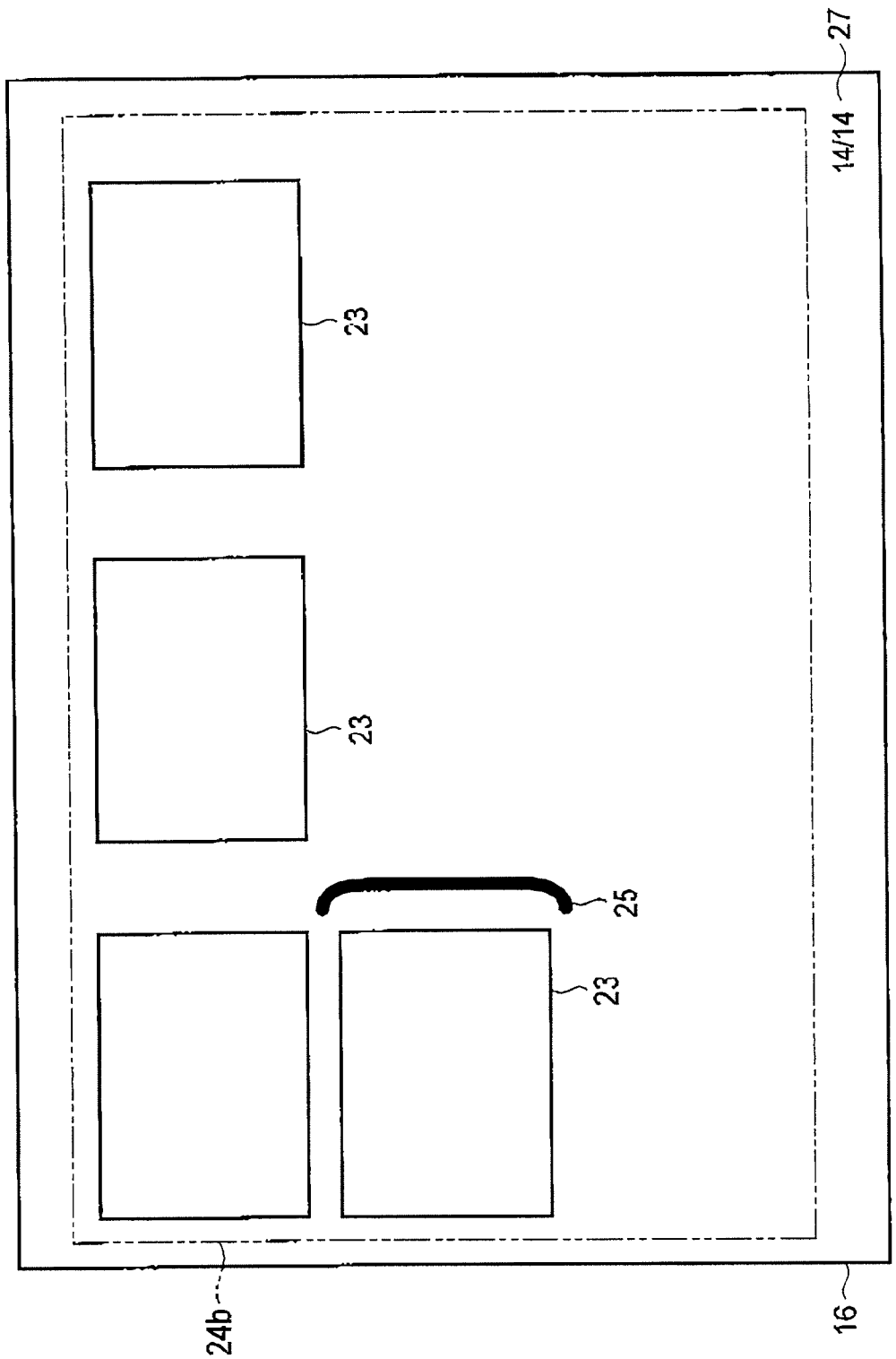
FIG. 5 illustrates the second catalog page among the catalog pages generated for an image folder, as displayed on the monitor.

For example, if an imago folder 21 includes fourteen image files 22, nine thumbnails 23 of image files 22 having file names including the first to ninth sequential numbers are allocated into and displayed on a first catalog page 24a (see FIG. 4) and five thumbnails 23 of image files 22 having file names including the tenth to fourteenth sequential numbers are allocated into and displayed on a second catalog; page 24b (sea FIG. 5).

A selection bar 25 is displayed as if attached to one of the displayed thumbnails 23. The selection bar 25 indicates that the thumbnail 23 which the selection bar 25 is attached to is selected. When the user commands the digital camera 10 to display a captured image on the monitor 16 upon displaying the catalog page 24, the image corresponding the selected thumbnail 23 is displayed covering the whole display area of the monitor 16.

File-number information 27 is displayed at the right lower corner of the catalog page 24 (see FIGS. 3 to 5). The file-number information 27 consists of the sequential number of the image file 22 of the selected thumbnail 23 and the number of all the image files 22 included in an image folder 21 corresponding to the displayed catalog page 24. The sequential number and the number of all the image files 22 are displayed at left and right side with a between them.

For example in FIG. 3, an image folder 21 corresponding to the displayed catalog page 24 stores four image files 22. In addition, the thumbnail 23 of the second image file 22 is currently selected. Accordingly, in order to indicate that the second image file 22 among the four image files 21 in an image folder 21 is being selected, the file-number information "2/4" is displayed.

In addition, in the examples of FIGS. 4 and 5, an image folder corresponding to the displayed catalog page 24 stores fourteen image files 22. In addition, the thumbnail 23 of the fourth and fourteenth image files 22 are selected in the first and second catalog pages 24, respectively. Accordingly, in order to indicate that the fourth and fourteenth image files 22 of the fourteen image files 21 in a certain image folder 21 are selected upon, displaying the first and second catalog pages, the file-number information "4/14" (see FIG. 4) and "14/14" (see FIG. 5) are displayed on the first and second catalog pages, respectively.

In addition, if an image folder 21 other than the one on display on monitor 16 does exist in the external memory 19, an indicator 26a or 26b indicating the existence of additional or other image folder(s) 21 is displayed at the top and/or bottom of the catalog page 24.

Figure 6:
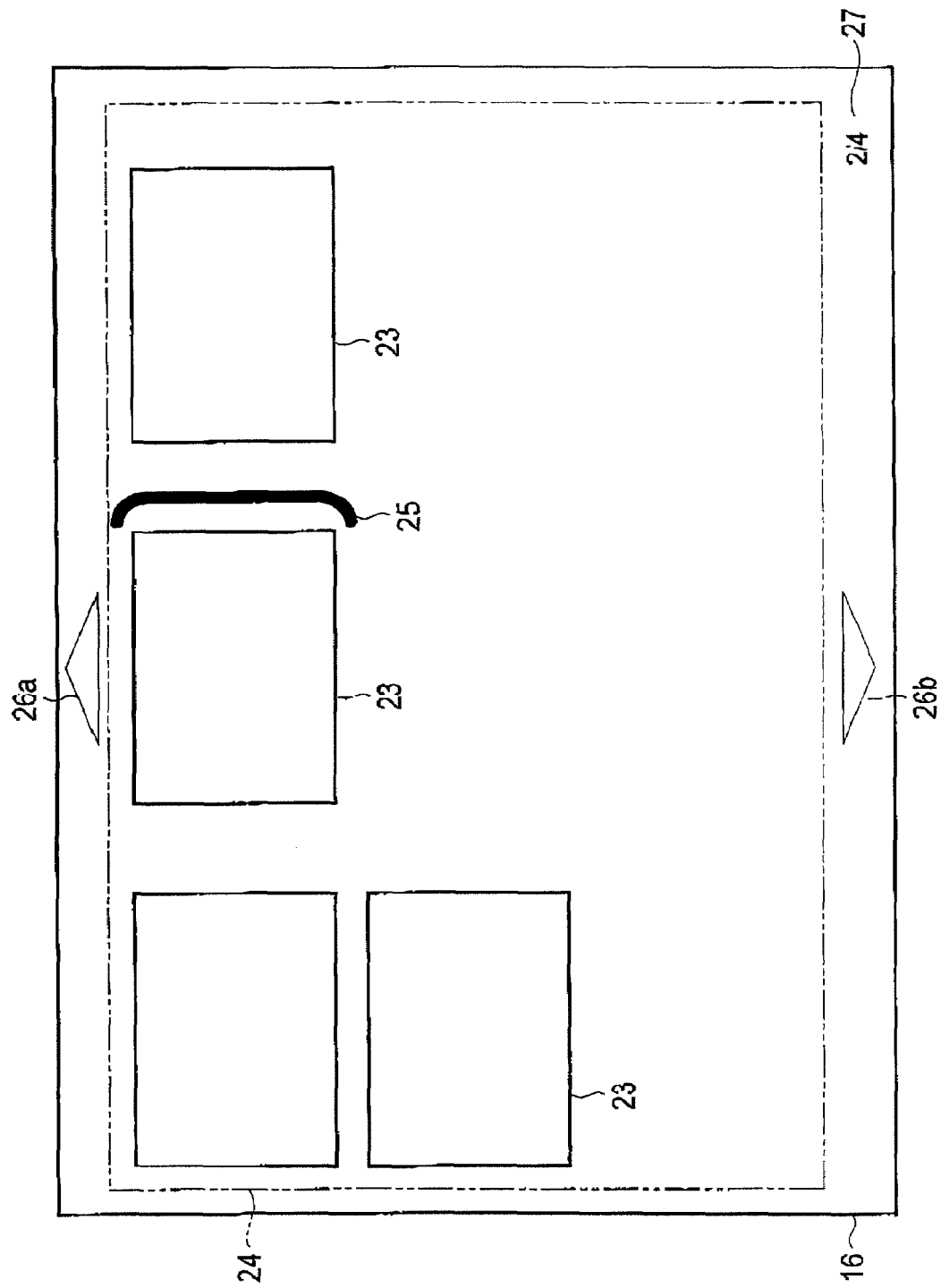
FIG. 6 illustrates a catalog page with upward and downward indicators as displayed on the monitor.

As shown in FIG. 6, if there exists an image folder 21 whose ordinal number is less than that of the image folder 21 corresponding to the displayed catalog page 24, an upward indicator 26a (first existence information) is displayed above beyond the catalog page 24. In addition, if there exists an image folder 21 whose order is more than that of the image folder 21 corresponding to the displayed catalog page 24, a downward indicator 26b (second existence information) is displayed under beyond the catalog page 24. In addition, if only a single image folder 21 exists in the external memory 18, neither the upward nor downward indicator 26a or 26b is not displayed (see FIGS. 3 to 5).

The digital camera 10 has photographing mode and displaying mode. While the digital camera 10 is in the photographing mode, a subject can be photographed. In addition. While the digital camera 10 is in the displaying mode, an image captured by photographing or a catalog page 24 is displayed on the monitor 16.

Figure 7:
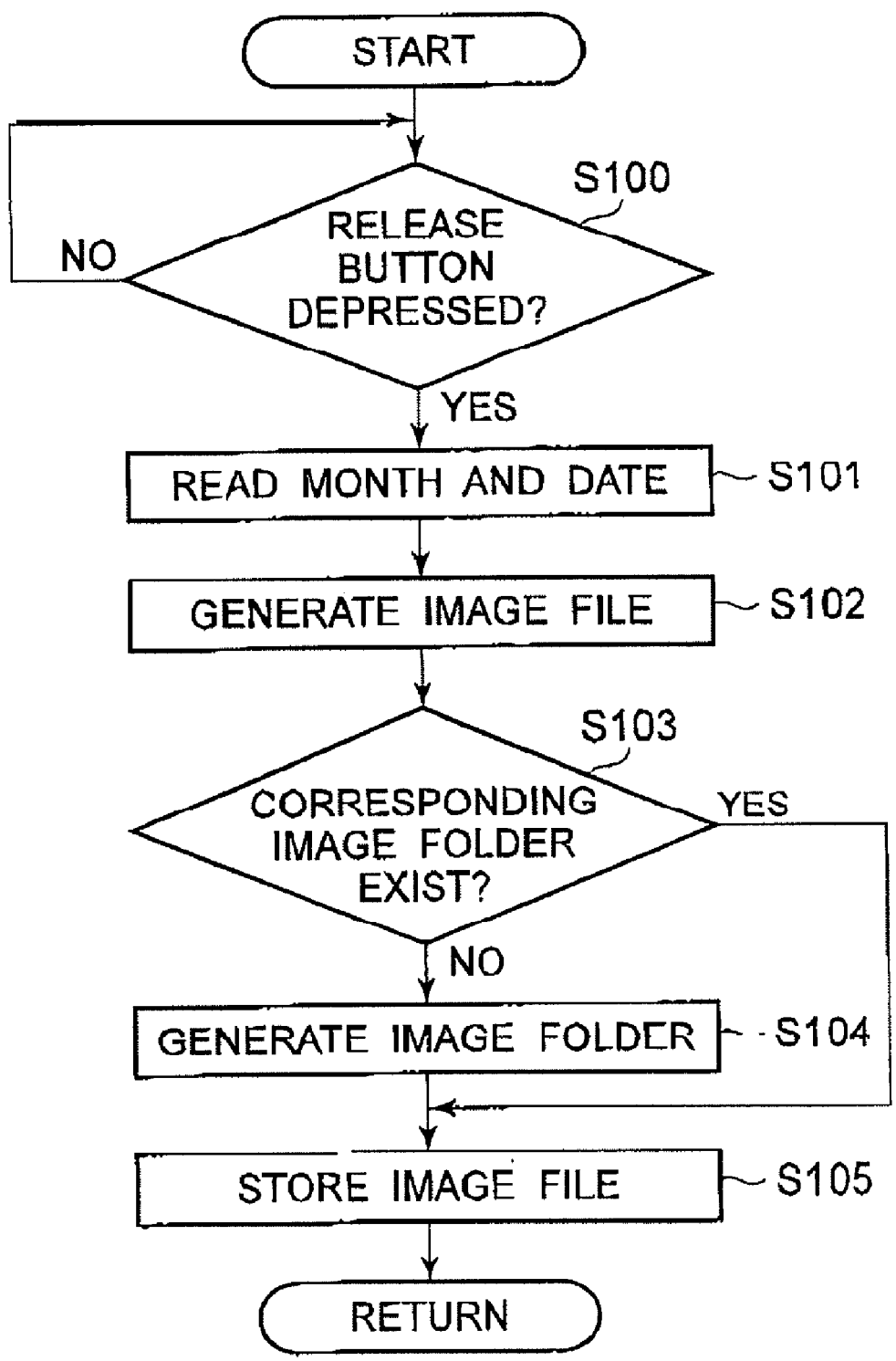
FIG. 7 is a flowchart illustrating the photographing process carried out by the system controller and the signal-processing circuit of the digital camera.

Next, the photographing process carried out by the system controller 14 and the signal-processing circuit 15 in the photographing mode is explained below using the flowchart of FIG. 7.

The photographing process commences when the operation mode of the digital camera 10 is changed to the photographing mode. Otherwise, the photographing process terminates when the digital camera 10 is switched off or the operation mode is changed to another operation mode.

At step S100, the system controller 14 determines whether or not the release button 13 is depressed. If the release button 13 is not depressed, step S100 is repeated until the release button 13 is depressed. If the release button 13 is depressed, the process proceeds to step S101.

At step S101, the system controller 14 reads the present month and date from the clock 19. After reading the present month and date, the process proceeds to step S102, where the signal-processing circuit 15 generates an image file 22 on the basis or an image signal generated by the imaging device 12. After generating the image file 22, the process proceeds to step S103.

At step S103, the system controller 14 determines whether or not an image folder 21 whose folder name including the present month and date read at step S103 exists in the external memory 18.

If an image folder 21 whose name includes the present month and date does not exist in the external memory 18, the process proceeds to step S104. At step S104, the system controller 14 generates a new image folder 21 in the external memory 18 on the basis of the order of the latest image folder 21 that exists in the external memory 18 before generating a new image folder 21 and the present month and date.

After generating a new image folder 21, the process proceeds to step S105. In addition, if it is determined at step S103 that an image folder whose folder name includes the present month and date does exist, the process skips step S101 and proceeds to step S105.

At step S105, the signal-processing circuit 15 orders the external memory 18 to store the image file 22 generated at step S102 in the image folder 21 whose folder name includes the present month and date.

Figure 8:
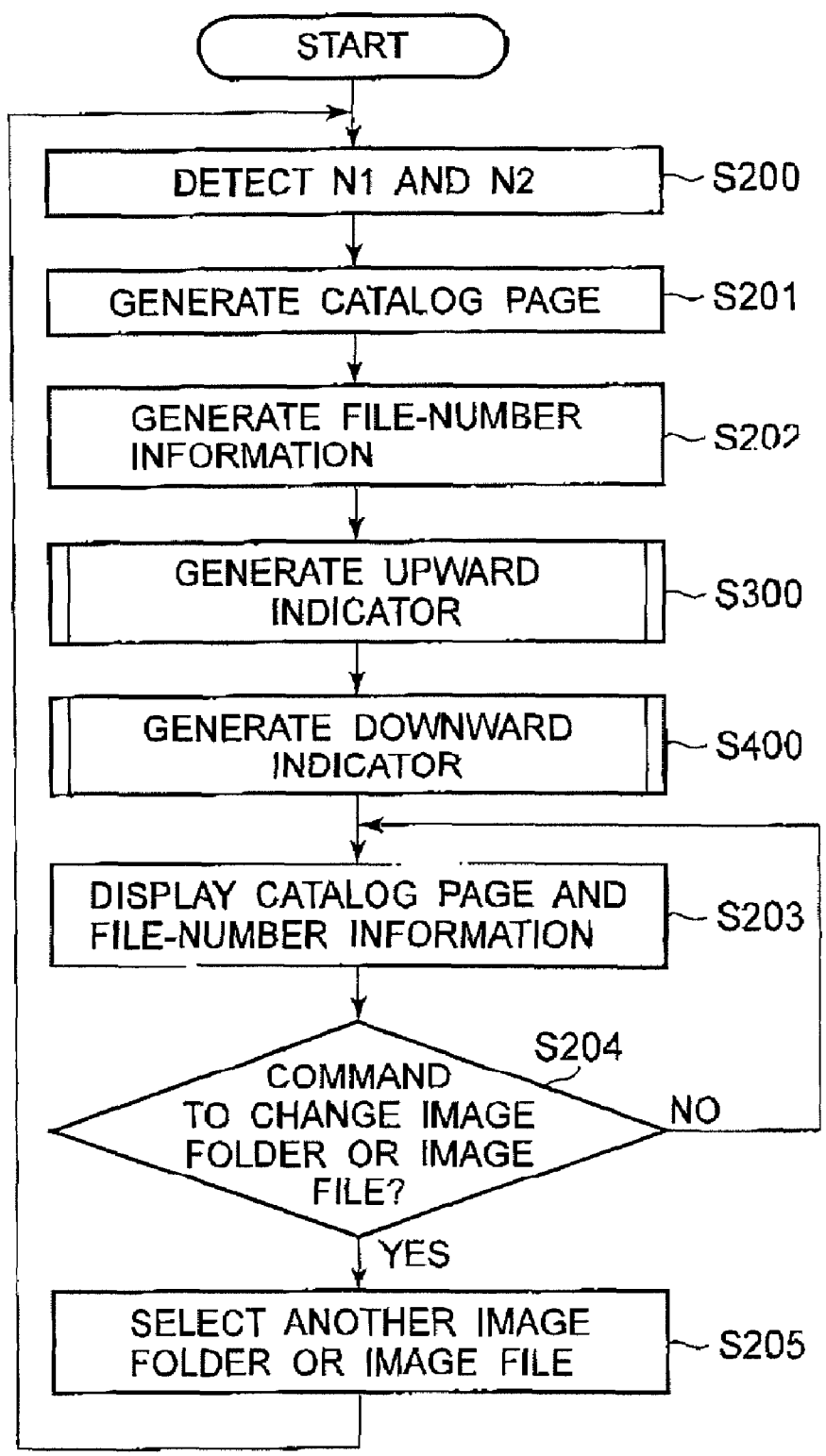
FIG. 8 is a flowchart illustrating the process for displaying the catalog page carried out by the system controller and the signal-processing circuit of the digital camera.
Figure 9:
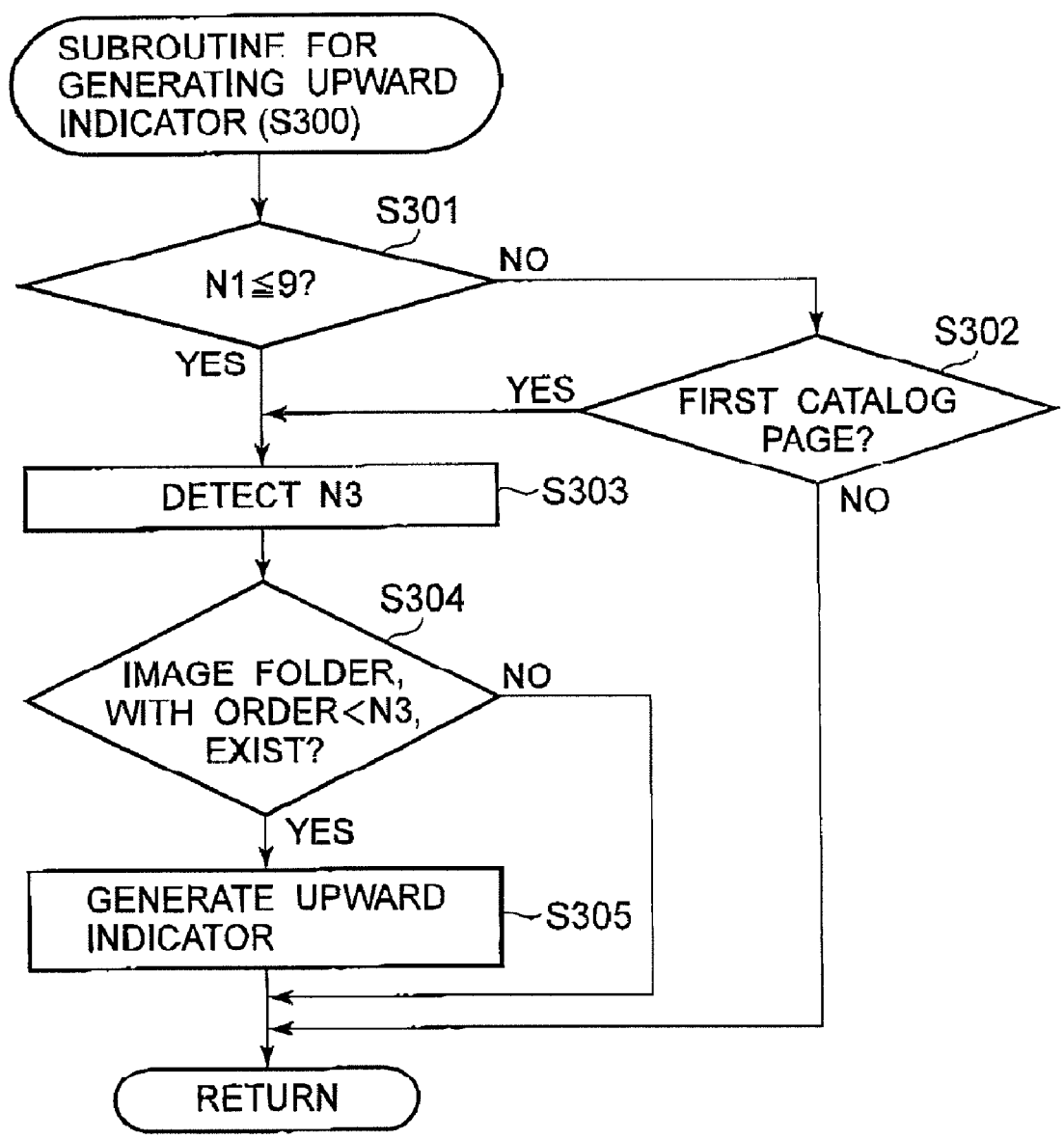
FIG. 9 is a flowchart illustrating the subroutine for generating the upward indicator.
Figure 10:
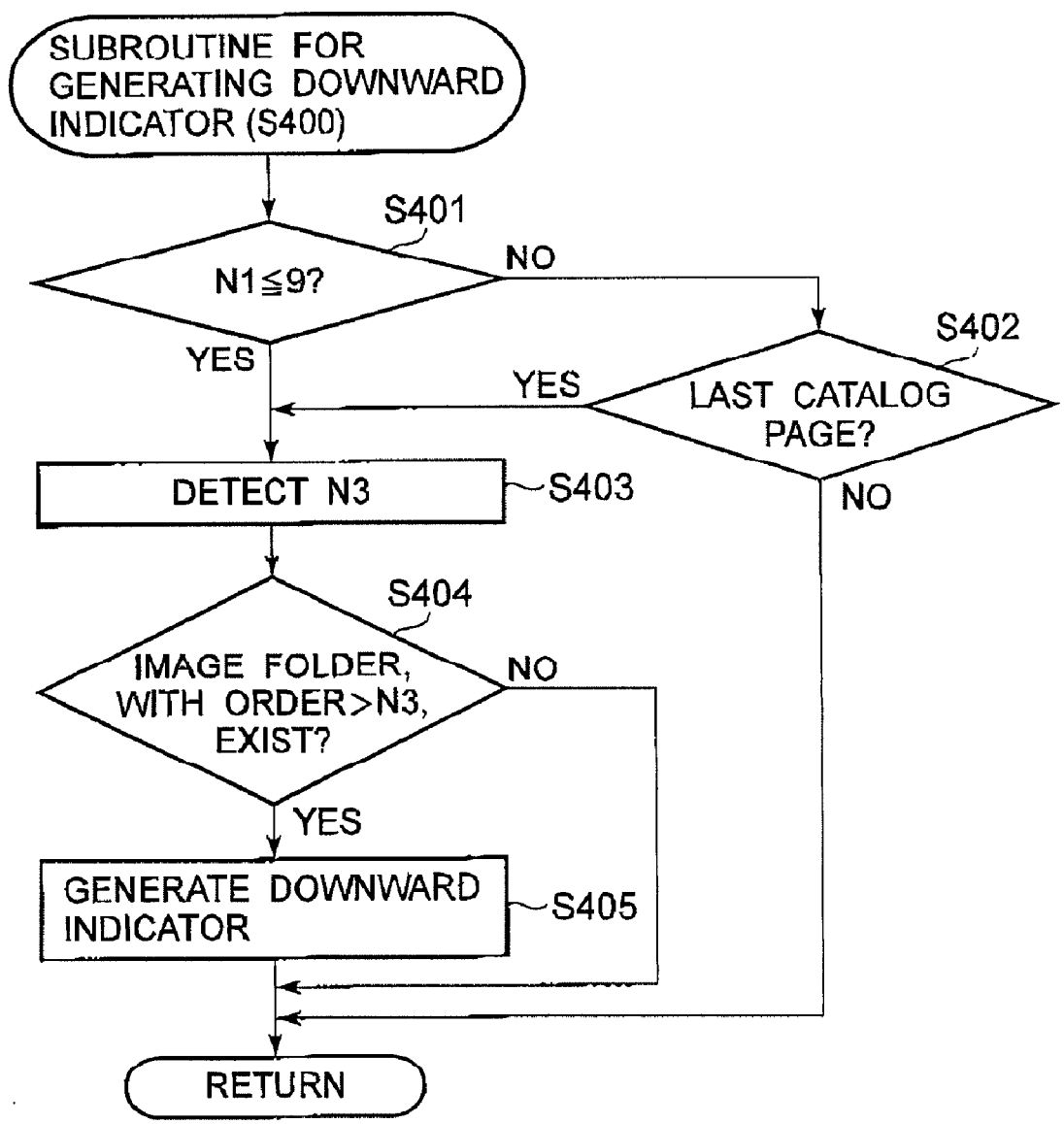
FIG. 10 is a flowchart illustrating the subroutine for generating the downward indicator.

Next, the process for displaying the catalog page 24, carried out by the system controller 14 and the signal-processing circuit 14 in the displaying mode is explained below using the flowcharts of FIGS. 8 to 10.

The process for displaying the catalog page 24 commences when the operation mode of the digital camera 10 changes to the displaying mode. Otherwise, the process for displaying the catalog page 24 terminates when the digital camera 10 is switched off or the operation mode is changed to another operation mode.

At step S200, the system controller 14 detects the number of image files 22 stored in the selected image folder 21, hereinafter referred to as N1, and the sequential number of the image file 22 of the selected thumbnail 23 in the image folder 21, hereinafter referred to as N2. Also, soon after displaying the catalog page 24 in the displaying mode, the image folder 21 of the highest order in the external memory 18 and the image file 22 of the highest sequential number in the image folder 21 are selected. After detection, the process proceeds to step S201.

At step S201, the signal-processing circuit 15 generates a catalog page 24 including the selected image files 22.

If N1 is a multiple of nine or the catalog page 24 to be generated is not the final catalog page of the selected image folder 21, the catalog page 24 is generated so that the catalog page 24 includes nine thumbnails 23 of nine image files 22 whose sequential numbers are (9×n−8) to 9×n (n being a positive integer, more than or equal to N2/9, and less than or equal to (N2+8)/9). In addition, in the catalog page 24 to be generated, a selection bar 25 is attached to the thumbnail 23 of the selected image file 22.

If N1 is not a multiple of nine (N1 being equal to (9×n+a) and "a" being an integer between 1 and eight), and the catalog page 24 to be generated is the final catalog page of the selected image folder 21 (then the N2 being equal to (9×n+b) and "b" being a integer less than or equal to the "a"), the catalog page 24 is generated so that the catalog page 24 includes the number "a" of thumbnails 23. After generation of the catalog page 24, the process proceeds to step S202.

At step S202, the file-number information 27 represented by "N2/N1" is generated on the basis of N1 and N2 detected at step S200. After generation of the file-number information 27, the process proceeds to step S300.

At step S300, the subroutine for generating the upward indicator is carried out. As shown in FIG. 9, when the subroutine for generating the upward indicator commences, the process proceeds to step S301, where the system controller 14 determines whether or not N1 is less than or equal to nine. If N1 is more than nine, the process proceeds to step S302. On the other hand, if N1 is less than or equal to nine, the process skips step S302 and proceeds to step S303.

At Step S302, the system controller 14 determines whether or not the catalog page 24 generated at step S201 is the first catalog page for the selected image folder 21, that is, whether the catalog page 24 includes thumbnails 23 of the first to ninth image files 22. If the generated catalog page 24 is in fact the first catalog page, the process proceeds to step S303.

At step S303, the system controller 14 detects the order of the selected image folder 21, hereinafter referred to as N3, and the process proceeds to step S304.

At step S304, the system controller 14 determines whether or not an imago folder 21 whose ordinal number is less than N3 exists in the external memory 19. If the image folder 21 of which order is less than the N3 exists, the process proceeds to step S305.

At step S305, the signal-processing circuit 15 generates the upward indicator 26a. After generation of the upward indicator 26a, the subroutine for generating the upward indicator terminates. For example, if folders named "101_0725" and "101_0724" exist and the folder named "101_0725" is to be displayed on the monitor 16, then the upward indicator 26a will be displayed. In addition, if it is determined at step S302 that the generated catalog page 24 is not the first catalog page or it is determined at step S304 that an image folder 21 whose ordinal number is less than N3 does not exist, the subroutine for generating the upward indicator terminates without generating the upward indicator 26a. For example, if folders named "101_0725" and "101_0724" exist and the folder named "101_0724" is to be displayed on the monitor 16, then the upward indicator 26a will not be displayed. After finishing the subroutine, the process proceeds to steps S400 (see FIG. 8).

At step S400, the subroutine for generating the downward indicator is carried out. As shown in FIG. 10, when the subroutine for generating the downward indicator commences, the process proceeds to step S401, where the system controller 14 determines whether or not N1 is less than or equal to nine. If N1 is greater than nine, the process proceeds to step S402. On the other hand, if N1 is less than or equal to nine, the process skips step S402 and proceeds to step S403.

At step S402, the system controller 14 determines whether or not the catalog page 24 generated at step S201 is the last catalog page for the selected image folder 21, that is, the catalog page 24 includes thumbnails 23 of the last image files 22. If the generated catalog page 24 is the last catalog page, the process proceeds to step S403.

At step S403, the system controller 14 reads N3, and the process proceeds to step S404. At step S404, the system controller 14 determines whether or not an image folder 21 whose ordinal number is greater than N3 exists in the external memory 18. If an image folder 21 whose ordinal number is greater than N3 exists, the process proceeds to step S405.

At step S405, the signal-processing circuit 15 generates the downward indicator 26b. After generation of the downward indicator 26b, the subroutine for generating the downward indicator terminates. For example, if folders named "101_0725" and "101_1031" exist and the folder named "101_0725" is t be displayed on the monitor 16, then the downward indicator 26a will be displayed. In addition, if it is determined at step S402 that the generated catalog page 24 is not the last catalog page or it is determined at step S404 that an image folder 21 with ordinal number greater than N3 does not exist, the subroutine for generating the downward indicator terminates without generating the downward indicator 26b. After finishing the subroutine, the process proceeds to steps S203 (see FIG. 8).

At step S203, the signal-processing circuit 15 displays the catalog page 24 generated at step S201 and the file-number information 27 generated at step S202 on the monitor 16. If the upward indicator 26a is generated at the subroutine S300, the signal-processing circuit 15 additionally displays the upward indicator 26a. If the downward indicator 26b is generated at the subroutine S400, the signal-processing circuit 15 additionally displays the downward indicator 26b. After displaying the catalog page, the process proceeds to step S204.

At step S204, the system controller 14 determines whether or not a command to change the selection of the image folder 21 or the image file 22 has been input, if the command has not input, the process returns to step S203. If the command has been input, the process proceeds to step S205.

At step S205, the system controller 14 selects another image folder 21 or another image file 22 according to the command input at step S204. After the selection, the process proceeds to step S200.

In the above embodiment, the catalog page for a selected image folder 21 is generated and displayed. In addition, if another image folder 21 exists in the external memory 18, the indicator 26a or 26b is displayed. The search of a requiring image file 22 is easy because the user can determine whether or not another image folder 21 exists owing to the existence or nonexistence of the upward and downward indicators 26a and 26b.

In addition, the time to take the system controller 14 to read some data of image files 22 for displaying the catalog page in the above embodiment is reduced compared to other digital cameras because only some of the data of the image files 22 from only a selected image folder 21 is read in the above embodiment while data in all the image folders 21 existing in the external memory are read in other digital cameras. Accordingly, the catalog page can be quickly displayed after a command to carry out the displaying mode is input.

In the above embodiment, the catalog page generation system of the present invention is adopted for displaying the catalog page on the monitor 16 of the digital camera 10. However, the catalog page generation system is adaptable for any other device which stores data files in a folder or directory structure and displays a catalog page of stored data in a certain folder or directory. For example, the catalog page generation system is adoptable in a personal computer.

In the above embodiment, an image file 22 is stored in an image folder 21, and a catalog page 24 of image files 22 for every image folder 21 is generated. However, the files stored in a folder are not limited to image files. For example, text files or music files can be stored and a catalog page of such files for every folder can be generated.

The catalog page of thumbnails 23 of image files 22 stored in an image folder 21 are generated, in the above embodiment. However, a catalog page containing items other than image thumbnails may be generated. For example, a catalog page of just the file names of image files can be generated.

The upward and downward indicators 26a and 26b are displayed at the center of the upper and lower ends of a display area of the monitor 16, respectively, in the above embodiment. However, the indicators 26a and 26b can be displayed anywhere.

In the above embodiment, the upward and/or downward indicator 26a and 26b are generated and displayed in addition to the catalog page 24 when an image folder 21 other than the image folder 21 corresponding to the presently displayed catalog page 24 exists. However, any other information (existence information) which can inform the user of the existence of another image folder 21 can be added to the catalog page 24 instead of the indicator 26a and 26b. For example, displayed information on the monitor 26a, such as letters and symbols, phonetic information, or visual information, such as emission of a lamp out of the monitor 16 can be added to the catalog page 24.

When all the image files 22 stored in an image folder 21 are deleted, the image folder 21 is automatically deleted in the above embodiment. However, the image folder 21 does not have to be deleted. If the image folder 21 is not automatically deleted, an image folder 21 holding no image file 22 may exist in an external memory 18 upon generating a new catalog page 24. Using a digital camera whose image folder is not automatically deleted, if the system controller (second determination circuit) determines that an image folder other than the image folder corresponding to the displayed catalog page 24 exists in the external memory 18 and the image folder contains image files, it is preferable to display the upward and/or downward indicators 26a and 26b.

In the above embodiment, the order of the image folder 21 is included in the folder name of the image folder 21. However, the order does not have to be included in the folder name. As long as data of the order is added to each image file, the system controller can determine whether or not there exists another folder file generated before or after the present folder file.

If there exist more image files 22 than the predetermined number to be displayed in a single catalog page 24 are contained in a given image folder 21, the image files will be allocated into and displayed in a plurality of catalog pages 24, in the above embodiment. However, all the image files 22 in an image folder 21 can be displayed in a single catalog page 24. The same effect can be achieved as long as the existence of another image folder can be indicated by displaying the upward and downward indicators 26a and 26b.

In the above embodiment, at most nine thumbnails arranged in three rows and three columns can be display on a single catalog page 24. However, the maximum number of thumbnails to display in a single catalog page 24 is not limited to nine. For example, thumbnails can be displayed arranged in 2 rows and columns, or 4 rows and columns, etc.

In the above embodiment, file-number information 27 is generated and displayed in addition to the catalog page 24. However, additional information (order information) which can indicate the order of catalog pages for a single image folder 21 can also be displayed. For example, the order of a presently displayed catalog page 24 can be displayed together with a scroll bar on the displayed catalog page 24.

The above embodiment can be implemented by installing a program for catalog page generation onto an all purpose computer which processes objects stored in folder or directory structures. The program for catalog page generation comprises a first generation code segment, a first determination code segment, and a second generation code segment. The first generation code segment orders a CPU (not depicted) to generate a catalog page of objects included in a first directory or first folder. The first determination code segment causes the CPU to determine whether or not a second directory different from the first directory or a second folder different from the first folder exists. The second generation code segment orders the CPU to generate existence information if the first determination circuit determines that the second directory or the second folder exists.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-052537 (filed on Mar. 3, 2008), which is expressly incorporated herein, by reference, in its entirety.

The invention claimed is:

1. A catalog page generation system, comprising:
a memory;
a first generation circuit that comprises a processor that generates a catalog page of objects included in a first folder;
a monitor on which the catalog page of the objects included in the first folder is displayed;
a first determination circuit that determines whether or not second folder different from the first folder exists, based upon the displayed catalog page;
a second generation circuit that generates existence information if the first determination circuit determines that the second folder exists, based upon the displayed catalog page, the existence information indicating the existence of the second folder at the same level as the first folder, based upon the displayed catalog page; and
an existence indicator being displayed as the existence information on the monitor if the second generation circuit generates the existence information,
wherein the existence indicator is displayed beyond an area displaying the catalog page of the objects included in the first folder on the monitor,
ordered sequence information are assigned to the first folder and the second folder, and
the existence information generated when the ordered sequence information assigned to the second folder precedes the ordered sequence information assigned to the first folder, respectively, constitutes a first existence information, and the first existence information indicates that the ordered sequence information assigned to the second folder precedes the ordered sequence information assigned to the first folder.

2. A catalog page generation system according to claim 1, further comprising a second determination circuit that determines whether or not the second folder contains an object, the second generation circuit generating the existence information if the second determination circuit determines that the second folder includes an object.

3. A catalog page generation system according to claim 1, wherein the existence information generated when the ordered sequence information assigned to the second folder succeeds the ordered sequence information assigned to the first folder, respectively, constitutes second existence information, and the second existence information indicates that the ordered sequence information assigned to the second folder succeeds the ordered sequence information assigned to the first folder.

4. A catalog page generation system according to claim 1, wherein if the number of objects included in the first folder is greater than a predetermined maximum number of objects to be displayed in the catalog page, a subset of the objects are allocated into a first catalog page and another subset are allocated into a second catalog page, and the first catalog page and the second catalog page are among a plurality of catalog pages generated by the first generation circuit.

5. A catalog page generation system according to claim 4, further comprising an addition circuit that adds order information to the first catalog page and the second catalog page upon displaying the first catalog page and the second catalog page, the order information indicating the order of the plurality of catalog pages for the first folder.

6. A catalog page generation system according to claim 1, wherein at least one of the objects is an image file.

7. A catalog page generation system according to claim 6, wherein a thumbnail of the image file is displayed in the catalog page.

8. A digital camera, comprising:
a first generation circuit that generates a catalog page of objects included in a first folder;
a monitor on which the catalog page of the objects included in the first folder is displayed;
a first determination circuit that determines whether or not a second folder different from the first folder exists, based upon the displayed catalog page;
a second generation circuit that generates existence information if the first determination circuit determines that or the second folder exists, based upon the displayed catalog page, the existence information indicating the existence of the second folder at the same level as the first folder, based upon the displayed catalog page; and
an existence indicator being displayed as the existence information on the monitor if the second generation circuit generates the existence information,
wherein the existence indicator is displayed beyond an area displaying the catalog page of the objects included in the first folder on the monitor,
ordered sequence information are assigned to the first folder and the second folder, and
the existence information generated when the ordered sequence information assigned to the second folder precedes the ordered sequence information assigned to the first folder, respectively, constitutes a first existence information, and the first existence information indicates that the ordered sequence information assigned to the second folder precedes the ordered sequence information assigned to the first folder.

9. A non-transitory computer-readable medium which stores a computer program, the computer program comprising code that causes a computer to:
generate a catalog page of objects included in a first folder;
display the catalog page of the objects included in the first folder on a monitor;

determine whether or not a second folder different from the first folder exists, based upon the displayed catalog page;

generate existence information if it is determined that the second folder exists, based upon the displayed catalog page, the existence information indicating the existence of the second folder at the same level as the first folder, based upon the displayed catalog page; and display an existence indicator as the existence information on the monitor if the existence information is generated, wherein the existence indicator is displayed beyond an area displaying the catalog page of the objects included in the first folder on the monitor, ordered sequence information are assigned to the first folder and the second folder, and the existence information generated when the ordered sequence information assigned to the second folder precedes the ordered sequence information assigned to the first folder, respectively, constitutes a first existence information, and the first existence information indicates that the ordered sequence information assigned to the second folder precedes the ordered sequence information assigned to the first folder.

10. A method for catalog page generation, comprising:

generating a catalog page of objects included in a first folder;

displaying the catalog page of the objects included in the first folder on a monitor;

determining whether or not second folder different from the first folder exists, based upon the displayed catalog page;

generating existence information if it is determined that the second folder exists, based upon the displayed catalog page, the existence information indicating the existence of the second folder at the same level as the first folder, based upon the displayed catalog page; and displaying an existence indicator as the existence information on the monitor if the existence information is generated, wherein the existence indicator is displayed beyond an area displaying the catalog page of the objects included in the first folder on the monitor, ordered sequence information are assigned to the first folder and the second folder, and the existence information generated when the ordered sequence information assigned to the second folder precedes the ordered sequence information assigned to the first folder, respectively, constitutes a first existence information, and the first existence information indicates that the ordered sequence information assigned to the second folder precedes the ordered sequence information assigned to the first folder.

* * * * *